(12) United States Patent
Perret et al.

(10) Patent No.: US 10,817,815 B2
(45) Date of Patent: Oct. 27, 2020

(54) PROVIDING ATTENDEES FROM A DIFFERENT ORGANIZATION WITH SUPPLEMENTAL INFORMATION RELATED TO A CALENDAR EVENT

(71) Applicant: salesforce.com, inc., San Francisco, CA (US)

(72) Inventors: Eric Alexander Hurlimann Perret, San Francisco, CA (US); Anthony Desportes, San Francisco, CA (US); Kapildev Reddy Gowru, San Francisco, CA (US); Tigran Abovyan, North Bergen, NJ (US); Ravi L. Honakere, San Ramon, CA (US); Kayvaan Ghassemieh, San Francisco, CA (US); Vatsal Shah, Hayward, CA (US)

(73) Assignee: salesforce.com, inc., San Francisco, CA (US)

( * ) Notice: Subject to any disclaimer, the term of this patent is extended or adjusted under 35 U.S.C. 154(b) by 824 days.

(21) Appl. No.: 15/470,476

(22) Filed: Mar. 27, 2017

(65) Prior Publication Data
US 2018/0276593 A1    Sep. 27, 2018

(51) Int. Cl.
*G06Q 10/06* (2012.01)
*G06Q 10/10* (2012.01)
(Continued)

(52) U.S. Cl.
CPC . *G06Q 10/063116* (2013.01); *G06F 16/9535* (2019.01); *G06Q 10/1093* (2013.01);
(Continued)

(58) Field of Classification Search
CPC .......... G06Q 10/0631; G06Q 10/1093; G06Q 50/01; G06F 16/9535; H04L 51/32; H04L 67/1044
See application file for complete search history.

(56) References Cited

U.S. PATENT DOCUMENTS

| 5,577,188 A | 11/1996 | Zhu |
| 5,608,872 A | 3/1997 | Schwartz et al. |

(Continued)

*Primary Examiner* — Nasser M Goodarzi
*Assistant Examiner* — Adil Ocak
(74) *Attorney, Agent, or Firm* — LKGlobal | Lorenz & Kopf, LLP

(57) ABSTRACT

Methods and systems are provided for creating a calendar event in a calendar application to provide at least some attendees with access to supplemental information related to the calendar event. The calendar application is configurable to allow sharing of supplemental information between users who are affiliated with a first organization that utilizes the calendar application in a cloud computing system, and other users who are affiliated with a second organization. When a user affiliated with the first organization creates create a calendar event that includes a list of attendees that includes second user-attendee(s) affiliated with a second organization that utilizes the calendar application, the user can enable sharing of the supplemental information with any of the second user-attendees included in the list of attendees so that they are allowed to view the supplemental information when viewing the calendar event.

15 Claims, 11 Drawing Sheets

(51) Int. Cl.
*G06Q 50/00* (2012.01)
*H04L 12/58* (2006.01)
*H04L 29/08* (2006.01)
*G06F 16/9535* (2019.01)

(52) U.S. Cl.
CPC ............ *G06Q 50/01* (2013.01); *H04L 51/32* (2013.01); *H04L 67/1044* (2013.01); *H04L 67/10* (2013.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,343,365 B2 * | 3/2008 | Farnham .............. G06Q 10/109 715/853 |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,372,774 B2 * | 8/2019 | Gupta .................... G06Q 10/10 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |

(56) References Cited

U.S. PATENT DOCUMENTS

| | | | |
|---|---|---|---|
| 2010/0306824 A1* | 12/2010 | Gurney | G06F 21/6245 726/4 |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2015/0112738 A1* | 4/2015 | Marinaro | G06Q 10/02 705/5 |

* cited by examiner

PROVIDING ATTENDEES FROM A DIFFERENT ORGANIZATION WITH SUPPLEMENTAL INFORMATION RELATED TO A CALENDAR EVENT

TECHNICAL FIELD

Embodiments of the subject matter described herein relate generally to cloud-based computing. More particularly, embodiments of the subject matter relate to methods and systems for providing attendees from a different organization with supplemental information related to a calendar event.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple organizations or tenants from a common data storage element (also referred to as a "multi-tenant database"). The multi-tenant design provides several advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software between multiple sets of users.

A cloud-based computing environment can include a number of different data centers, and each data center can include a number of instances, where each instance can support many tenants (e.g., 10,000 tenants or more). As such, large numbers of tenants can be grouped together into and share an instance as tenants of that instance. Each tenant is its own organization (or org) that is identified by a unique identifier (ID) that represents that tenant's data within an instance.

Various calendar applications are in use today, including iCal™, Google™ Calendar, Microsoft™ Office 365, Microsoft™ Outlook with Exchange Server, Yahoo™ Calendar, and iCloud™ mail to name a few. These applications present an interface that allows a user to create an event at a specified time. The user may track various events, including meetings that the user has been invited to. Most calendar applications also allow a user to send invite requests for events to other users. When an invitee receives the request, the invitee can choose to accept or decline the request. If the invitee accepts, a corresponding event is typically created in the invitee's calendar.

Many professionals (e.g., sales and marketing professionals, engineers, attorneys, etc.) typically manage their day using an electronic calendar. However, presently known calendaring applications do not include contextual information that may be available from various sources, such as connected devices, social networking systems, and external databases. Thus, a person's calendar may include meetings with individuals and companies, but may lack contextual information about those entities.

In conventional calendar systems and applications, users are segregated based on paid accounts, and only very basic information is shared among users. For example, a calendar system of Company A might allow its employees to view some basic information about other employees who are invited to a meeting or other calendar event such as name, email address, free/busy status during a time slot. Anyone outside Company A who is invited to the same calendar event can typically only view details such as name and email address of Company A's employees who are invited.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 6 illustrates a screenshot that shows an example of a calendar event creation page in accordance with the disclosed embodiments.

FIG. 7 illustrates a screenshot of an attendee tab for a calendar event that shows an example of an inline popup window that can be displayed to show information about an attendee including supplemental information about that attended in accordance with the disclosed embodiments.

DETAILED DESCRIPTION

Figure 1:
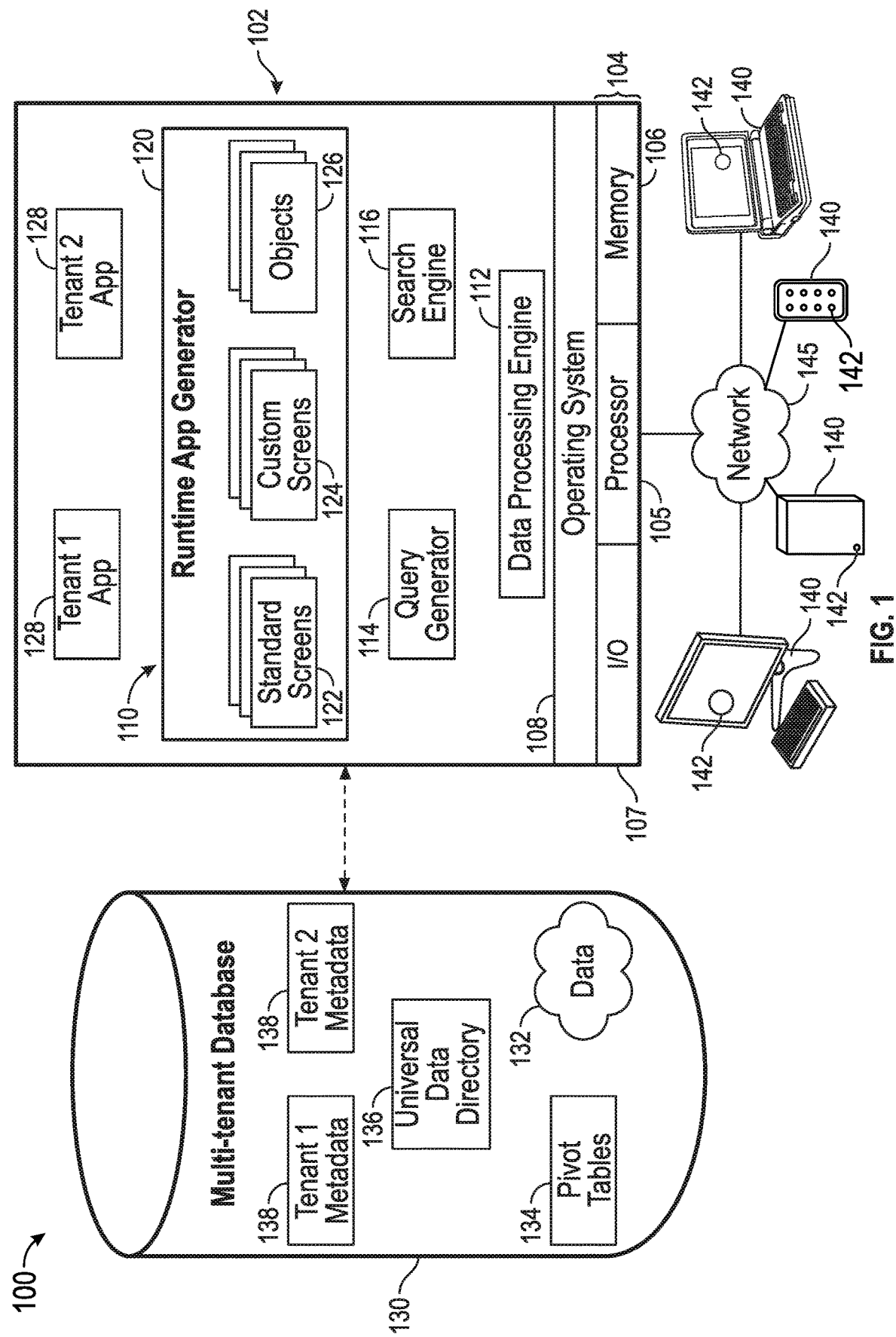
FIG. 1 is a schematic block diagram of an example of a multi-tenant computing environment in which features of the disclosed embodiments can be implemented in accordance with the disclosed embodiments.

It would be desirable to provide calendaring systems and applications that are configurable to allow calendar events to include supplemental or enhanced information that can help make meetings more productive even though that information would otherwise be restricted or unavailable under normal circumstances.

The exemplary embodiments presented here relate to systems, methods, procedures, and technology for providing attendees from a different organization with supplemental information related to a calendar event. The described subject matter can be implemented in the context of any cloud-based computing environment including, for example, a multi-tenant database system. Although the embodiments described herein will be described the context of cloud-based calendar applications and systems, the disclosed embodiments could also be applied in other non-cloud-based calendar applications and systems. For example, the disclosed embodiments could also be applied in the context of networked calendar applications where data is segregated into two or more groups that are independently accessible, but can be shared between groups by the applications. For instance, this could apply in a situation where a classified group of calendars and an unclassified group of calendars are maintained differently (e.g., on the system or students vs. administrators/teachers).

To address the issues discussed above, systems and methods are provided for creating a calendar event in a calendar application to provide at least some attendees with access to supplemental information related to the calendar event. The calendar application is configurable to allow sharing of supplemental information between users who are affiliated with a first organization that utilizes the calendar application in a cloud computing system, and other users who are affiliated with a second organization. When a user affiliated with the first organization creates create a calendar event that includes a list of attendees that includes second user-attendee(s) affiliated with a second organization that utilizes the calendar application, the user can enable sharing of the supplemental information with any of the second user-attendees included in the list of attendees so that they are allowed to view the supplemental information when viewing the calendar event. The supplemental information can include, for example, information about first-user attendees who are affiliated with the first organization and included on the list of attendees, or information about the first organization. The supplemental information for the first organization is normally access-restricted so that it is viewable by only the first-user attendees who are affiliated with the first organization (or may not be viewable by anyone except the user who created the event).

When the calendar application is configured to allow sharing of that supplemental information, access to the supplemental information is no longer restricted, and any of the second user-attendees who are affiliated with the second organization are then permitted to access (e.g., view and interact with) the supplemental information. For example, in one embodiment, when one of the second-user attendees included on the list of attendees is viewing the calendar event and interacts with user interface element for a particular first-user attendee, an inline popup window can be displayed that includes the supplemental information about that particular first-user attendee, and any of the second user-attendees who are affiliated with the second organization and included in the list of attendees will have access to the supplemental information that would not otherwise be available in the calendar.

In one embodiment, an administrator can control access to the supplemental information by configuring the calendar application, via an administrator control panel, to allow sharing of the supplemental information between users who are affiliated with the first organization in a cloud computing system and other users who are affiliated with the second organization in the cloud computing system who use the same calendar application. For example, in one implementation, the administrator can specify certain fields from a group of available fields as being shared fields for the first organization. The group of available fields can include user fields from a user table that specifies information about a user, organization fields from an organization table that specifies information about the organization, and/or custom fields added by an administrator to either the user table, the organization table or another table. In one implementation, the group of available fields can include information that comes from a multi-tenant database system and/or information that comes from sources that are external to the multi-tenant database system.

The shared fields are those that are allowed to be viewed by the second user-attendees who are affiliated with the second organization so that the supplemental information for the first user-attendees is shared with and allowed to be viewed by the second user-attendees who are affiliated with the second organization. The administrator may leave other fields from the group of available fields as restricted fields for the first organization. The restricted fields each specify restricted information that is not allowed to be viewed by the second user-attendees who are affiliated with the second organization, and therefore any restricted information for the first user-attendees is not shared with and not allowed to be viewed by the second user-attendees.

Thus, in contrast to other calendar systems and applications, the disclosed embodiments can provide users from different organizations to share supplemental information as part of calendar events. In other embodiments, the concept of an organization could be replaced with an account of user in a cloud-based or non-cloud based calendaring system. This way more relevant information can be shared to make for more productive meetings. For example, if there is a meeting with someone in a different organization, a user can view things such as biographies for other users, their working hours, which languages the other attendees speak, which countries they are in, etc. This becomes even more useful when working with people from other companies.

Prior to describing an exemplary embodiment with reference to the drawings, certain terminology will be defined.

As used herein, the term "multi-tenant database system" refers to those systems in which various elements of hardware and software of the database system may be shared by one or more tenants. For example, a given application server may simultaneously process requests for a great number of tenants, and a given database table may store rows for a potentially much greater number of tenants. In a multitenant architecture, a number of tenants share IT resources such as database servers, application servers, and infrastructure required to run applications, resulting in an environment where resources are managed centrally.

A cloud-based computing environment can include a number of different data centers. Each data center can include a number of instances. Each instance can support many (e.g., 10,0000) tenants, where each tenant has their own organization (or org).

An instance (also known as a point of deployment (POD)) is a cluster of software and hardware represented as a single logical server that hosts multiple organization's data and runs their applications. An instance can be a self-contained unit that contains all that is required to run an instance including the application server, database server, database itself, search and file system. Large numbers of tenants, for example, 10,000, can be grouped together into and share an instance as tenants of that instance. A platform as a service (PaaS), such as the Force.com platform, can run on multiple instances, but data for any single organization is always stored on a single instance where their data resides. Each tenant is allocated to one and only one instance (or POD) and that is where their data resides. As such, an instance refers to a single logical server that multiple organizations live on as tenants. An instance can be identified in a URL by a region and a server number. For example, if it is assumed that there are currently 21 instances in North America, in the URL na8.salesforce.com, na8 can refer to particular server, where na refers to the general location of the server (North America) and 8 refers to the serverID within that general location (server 8 of 21 in North America).

An organization or "org" can be thought of as a logical container for one cohesive set of related data, metadata, configurations, settings and schemas that is separate from that of all other organizations. Each organization has or is associated with a unique identifier (ID) that represents a tenant's data within an instance. Each identifier defines a virtual or logical space provided to an individual tenant (e.g., a defined set of users) where all of that tenant's data and applications are stored within an instance so that it is separate from that of all other organizations that are part of that instance. Each unique identifier serves as the access key and security barrier for an individual tenant's data in the system. As such, each organization can be identified by its own unique identifier that allows that organization's data to be separated from data of other organizations. Even though all tenants within an instance share the same database, the organization's unique identifier is stored in every table to ensure that every row of data is linked back to the correct tenant and the data from other tenants sharing the same instance cannot be mixed up. Each organization can have its own custom content that is unique to that particular organization. For a particular organization, custom content can include metadata and associated data that is unique to that particular organization. Each organization can have custom fields, custom objects, workflows, data sharing rules, visual force pages and apex coding, etc. As such, each organization can be highly customized with respect to other organizations that are part of the same instance.

An environment is an organization used for a specific purpose. An organization can be used as a production environment unless it is housed on a sandbox instance, in which case the organization can be used for development, testing, integration, training or other non-production purposes. For example, tenants may have an organization is used as a production environment, another organization used for a development environment, another organization used for testing environment, another organization used for integration environment, another organization used for their training environment.

FIG. 1 is a schematic block diagram of an example of a multi-tenant computing environment in which features of the disclosed embodiments can be implemented in accordance with the disclosed embodiments. As shown in FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata from the UDD 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

Figure 2:
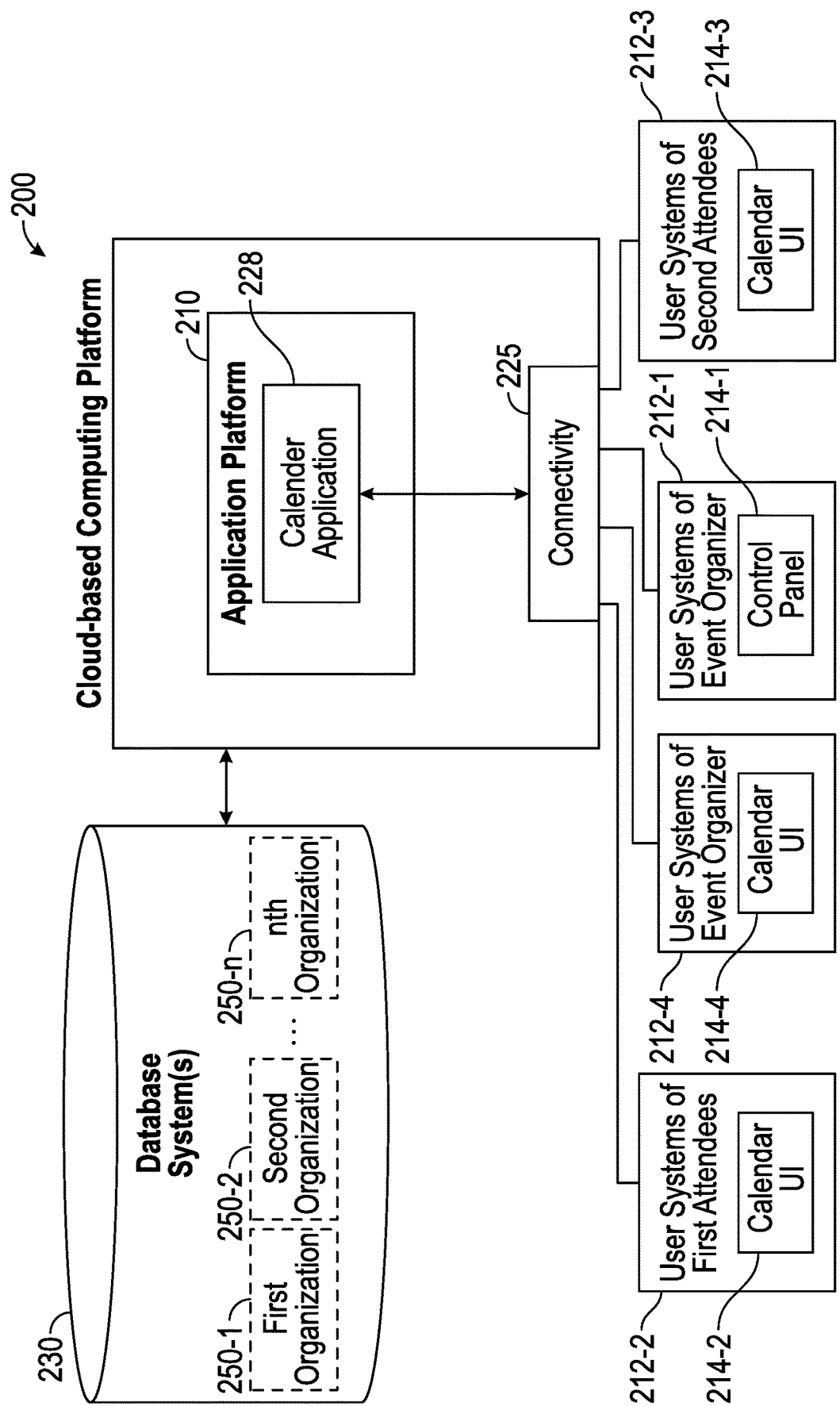
FIG. 2 is a block diagram of a system in accordance with the disclosed embodiments.

As noted above, the virtual application 128 may contain JAVA™, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 embodies the functionality of a collaboration solution such as the Chatter system, described below FIG. 2 is a block diagram of a cloud-based computing platform 200 in accordance with the disclosed embodiments. The cloud-based computing platform 200 is a system that can be shared by many different organizations, and handles the storage of, and access to, different metadata, objects, data and applications across disparate organizations. In one embodiment, the cloud-based computing platform 200 can be part of a database system, such as a multi-tenant database system. The cloud-based computing platform 200 is configured to handle requests for any user associated with any organization that is a tenant of the system. Although not illustrated, the cloud-based computing platform 200 can include other components such as a system database, one or more processing systems that execute the application, process space where the application runs, and program code that will be described in greater detail below.

The cloud-based computing platform 200 includes a connectivity engine 225 serves as a network interface that allows users of user systems 212 to establish a communicative connection to the cloud-based computing platform 200 over a network (not illustrated in FIG. 2) such as the Internet or any type of network described herein. This allows the various user systems 212 to connect to application platform 200. In one embodiment, the connectivity engine 225 can include an OAuth generator that provides organization tokens for a particular session. OAuth is an open standard for authorization that provides to clients a secure delegated access to server resources on behalf of a resource owner. OAuth standards specify a process for resource owners to authorize access to their server resources without sharing their credentials. OAuth allows access tokens to be issued to clients by an authorization server, with the approval of the resource owner. The client can then use the access token to access the protected resources hosted by the resource server.

The cloud-based computing platform 200 includes an application platform 210 and various user systems 212 that access various applications provided by the application platform 210. The application platform 210 is a cloud-based user interface. The application platform 210 has access to one or more database systems 230 that store information (e.g., data and metadata) for a number of different organizations 250-1, 250-2 including user information, organization information, custom information, etc. The database systems 230 can include a multi-tenant database system 130 as described with reference to FIG. 1, as well as other databases or sources of information that are external to the multi-tenant database system 130 of FIG. 1. In one embodiment, the multi-tenant database system 130 can store data in the form of records and customizations. As used herein, the term "record" refers to an instance of a data object created by a user of a database service, for example, about a particular (actual or potential) business relationship or project. The data object can have a data structure defined by the database service (a standard object) or defined by a subscriber (custom object). For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying to get. In one embodiment implementing a multi-tenant database, all of the records for the tenants have an identifier stored in a common table. A record has data fields that are defined by the structure of the object (e.g. fields of certain data types and purposes). A record can also have custom fields defined by a user. A field can be another record or include links thereto, thereby providing a parent-child relationship between the records. Customizations can include custom database objects and fields, Apex Code, Visualforce, Workflow, etc.

In the example illustrated in FIG. 2, only three organizations 250-1, 250-2, 250-n are illustrated for sake of simplicity, but it should be appreciated that the computing platform 200 can provide applications and services and store data for any number of organizations. To differentiate between the organizations 250-1 and 250-2, they will be referred to below as a first organization 250-1 and a second organization 250-2.

Each organization 250 can be thought of as a logical container for one cohesive set of related data, metadata, configurations, settings and schemas that is separate from that of all other organizations. Each organization 250 is illustrated in FIG. 2 using dotted-line boxes within the database system(s) 230 to represent that they are a logical boundary that logically segregates data and access to the data by a particular tenant. Although the organizations 250 are part of the same instance and share common infrastructure, each organization 250 has or is associated with a unique identifier (ID) that represents a tenant's data within an instance, and defines a virtual or logical space provided to an individual tenant (e.g., a defined set of users) where all of that tenant's data and applications are stored within an instance so that it is separate from that of all other organizations that are part of that instance. In this regard, the unique identifier for each organization serves as the access key and security barrier for an individual tenant's data in the system, and thus allows that organization's data to be separated from data of other organizations even though all tenants within an instance share the same database. The unique identifier for a particular organization is stored in every table to ensure that every row of data is linked back to the correct tenant and the data from other tenants sharing the same instance cannot be mixed up.

Each organization 250-1, 250-2 is a source of metadata and data associated with that metadata that collectively make up an application. Each organization can have its own custom content that is unique to that particular organization, and can be highly customized with respect to other organizations that are part of the same instance. For a particular organization, custom content can include metadata and associated data that is unique to that particular organization. In one implementation, the metadata can include customized content of the organization 250-1 (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, data sharing rules, automation rules and processes, etc. Data is associated with metadata to create an application. Data can be stored as one or more objects, where each object holds particular records for an organization. As such, data can include records (or user content) that are held by one or more objects. For example, a "calendar" object can hold calendar records of an organization.

Based on a user's interaction with a user system 212, the application platform 210 accesses an organization's data (e.g., records held by an object) and metadata that is stored at one or more database systems 230, and provides the user system 212 with access to applications based on that data and metadata. These applications can include a calendar application 228. In the context of the calendaring application 228, an organization owns data (e.g., records) and customizations that are normally only available to that organization (at least by default). However, as will be described below, data and customizations (referred to herein as "supplemental information") that would otherwise normally be private (or restricted to users of the organization) may be shared with other organizations.

The various user systems 212 can interact with a calendar application 228 provided by the cloud-based computing platform 200. The user systems will be described with ordinals to differentiate between them, but those ordinals do not implicate any order. Thus, as an example, user systems 212-2 associated with users who are affiliated with the first organization 250-1 will be referred to as first user systems 212-2, user systems 212-3 associated with users who are affiliated with the second organization 250-2 will be referred to as second user systems 212-3, a user system 212-1 that is associated with an administrator will be referred to herein as a third user system 212-1, and a user system 212-4 that is associated with an event organizer will be referred to herein as a fourth user system 212-4. It is noted that the event organizer can be a user who is affiliated with the first organization 250-1 or the second organization 250-2 or another organization (not illustrated), but for sake of simplicity of description, examples that will be described below will assume that the event organizer is affiliated with the first organization 250-1. Likewise, the administrator could be a user who is affiliated with the first organization 250-1 or the second organization 250-2 or another organization (not illustrated), but does not need to be associated with any organization, or could be associated with one or more organizations if they have access to more than organization or if the same settings can be applied to more than one organization. In one embodiment, the administrator can setup the calendar features for an organization and use the calendar to manage their own events. For instance, in the case of a school a single administrator could apply rules that apply to both the student's organization and to the staff/teacher's organization.

The calendar application 228 is executable to maintain one or more calendars that can be presented via a graphical interface 214 to a user of one of the user systems 212. For example, the graphical interfaces of user systems 212-2 (that are affiliated with the first organization 250-1) can display a calendar user interface 214-2. The calendar application 228 may allow the user to create calendar events on particular days at particular times, and allow a user to invite others to created calendar events as well as receive invitations from others to calendar events. The calendar application 228 may send an invitation to the other user, which can be accepted or declined. The calendar application 228 may also allow a user to set reminders for calendar events that trigger notifications (e.g., a reminder for a notification a certain amount of time before an event is scheduled to begin). The calendar application 228 may maintain a calendar by storing various forms of event information in one or more database systems 230. Event information may include, without limitation, an event name, the start and end times for the event, the invitees of the event, etc. In various embodiments, event information may be accessible to other processes. In addition, in accordance with the disclosed embodiments, the calendar application 228 may be configured to allow users to have access to supplemental information that would normally not be accessible by those users.

In this embodiment, the calendar application 228 is hosted via the cloud-based computing platform 200 to allow users to access their calendars from any computer or mobile device, and to also share information with other users. The calendar application 228 can vary depending on the implementation, and may be implemented by an existing calendar application, such as iCal™, Mozilla™ Sunbird, Windows™ Live Calendar, Google™ Calendar, Microsoft™ Office 365, Microsoft™ Outlook with Exchange Server, Salesforce.com Calendar, Salesforce Inbox for SalesforceIQ, or using various features thereof. The calendar application 228 can be customized by the user or administrator. The calendar application 228 can provide several different electronic calendars for each user. For example, a given user might have a work calendar, different group calendars within their work calendar, a personal calendar, children's calendar, etc. For example, a group calendar can be used to display calendar events for certain groups that a user is involved in at work. A user can combine and merge different calendars together to gain a better picture of all events on all calendars.

The calendar application 228 can display each calendar showing dates and days of the week with various time slots for each day. The user can view a particular calendar by hourly view, work day view, full day view, work week view, full week view, month view, etc. The calendar application 228 includes an address book or list of contacts with information to enable a user to communicate with the contacts. The calendar application 228 also includes appointment functionality such as an appointment or meeting calendar that includes a list of appointments and the attendees for the appointments. In some implementations, the calendar application 228 can detect scheduling conflicts, notifying the participants of the conflict, and suggesting alternate meeting times. The calendar application 228 can interface with an electronic mail communication system that interfaces with an appointment calendar to send reminders and notify the attendees of invitations to different calendar events (e.g., meetings), send reminders regarding a scheduled calendar event to attendees, or to notify attendees of any issues arising with scheduled calendar events. The calendar application 228 can automatically provide appointment reminders to remind participants of an upcoming meeting, and also includes an attachment feature that allows users to attach files to an appointment so that those files can be shared with other attendees who are participating in the meeting. To facilitate meeting scheduling among several individuals, the calendar application 228 includes features to that allow users to share their availability with other attendees (where users can select how much detail is shared). The calendar application 228 may include scheduling features that automatically check schedules of all attendees and propose a mutually convenient meeting time to all of the attendees. This allows the invitees to suggest times that will work best for them, allowing the event organizer to pick a meeting time that works best for all of the participants. In addition, the calendar application 228 can include scheduling features that allow users to schedule resources to help facilitate the meeting such as room reservation, on-line meeting scheduling (e.g., such as video conferencing or video call functions) that distributes dial in numbers and URLs for on-line meetings, etc. Depending on the implementation, the calendar application 228 can also include other optional features such as calendar publishing that allows a user to publish select calendar information on a public or private link, and calendar exporting that allows a user to export selected calendars into various file formats.

As will be described in greater detail below, users can use the calendar application 228 to create calendar events. In accordance with the disclosed embodiments, the calendar application 228 can be configured such that the calendar events can incorporate various data and other information from various database systems 230. To explain further, the first user system 212-1 displays an administrator control panel 214-1 that is configured to receive inputs. These inputs configure the calendar application 228 to allow sharing of supplemental information between different organizations when a calendar event is displayed using a calendar application 228. For instance, the calendar application 228 can be configured to allow user-attendees of user systems 212-2 (that are affiliated with the first organization 250-1) to automatically share supplemental information with other users of user systems 212-2 (that are affiliated with the second organization 250-2). As used herein, "user-attendees" refers to those users who are invited as part of a calendar event to attend that calendar event. In accordance with the disclosed embodiments, the calendar event can provide at least some user-attendees from the second organization 250-2 with access to supplemental information related to the calendar event that would not normally be viewable by or accessible to those attendees. For example, the supplemental information for user-attendees from the first organization 250-1 would normally be access-restricted so that it is not viewable at all as part of the calendar event by any of the attendees, or so that it is viewable only by those first-user attendees of the calendar event who are affiliated with the first organization 250-1. However, as will be explained in greater detail below, in accordance with the disclosed embodiments, the calendar application 228 can be configured to allow sharing of that supplemental information for organization 250-1 with "second" user-attendees who are affiliated with the organization 250-2. As such, the second user-attendees can access to at least some of the information (provided from the database systems 230) that would normally not be available to them or access-restricted.

For example, in one embodiment, the administrator can configure the calendar application 228 by using the administrator control panel 214-1 to specify certain fields from a group of available fields as being shared fields for the first organization 250-1. The shared fields are those that are allowed to be viewed by the second user-attendees, who are affiliated with the second organization 250-2, so that the supplemental information for the first user-attendees is shared with and allowed to be viewed by the second user-attendees who are affiliated with the second organization 250-2. Any other fields from the group of available fields that are not selected will remain as restricted fields for the first organization 250-1. In other words, the restricted fields each specify restricted information that is not allowed to be viewed by the second user-attendees who are affiliated with the second organization 250-2. This way certain restricted information for the first user-attendees, who are affiliated with the first organization 250-1, is not shared with and not allowed to be viewed by the second user-attendees who are affiliated with the second organization 250-2. As will be described in greater detail below, the group of available fields can include, for example, user fields from a user table that specifies information about the user, organization fields from an organization table that specifies information about the organization, and custom fields added by the administrator to either the user table, the organization table or another table.

After the administrator has configured the calendar application 228 to allow sharing of supplemental information, an event organizer who uses user system 212-4 can interact with the calendar application 228 via a calendar user interface 214-4 to create a calendar event, such as a meeting invitation or appointment. The event organizer who creates the calendar event can include a list of attendees who are invited to the calendar event. This list of attendees can include any number of attendees from any number of different organizations. These various attendees will be referred to below as "user-attendees," and it will be assumed that the list of user-attendees includes one or more second user-attendees who are affiliated with the second organization 250-2. To differentiate between different user-attendees (i.e., those users who are associated with or invited to the calendar event) who are affiliated with the first organization 250-1, will be referred to herein as first user-attendees, and user-attendees who are affiliated with the second organization 250-2 will be referred to herein as second user-attendees.

After creating the calendar event, the calendar user interface 214-4 of user system 212-4 will present the event organizer with an option to enable sharing of the supplemental information. When the event organizer selects this option and enables sharing of the supplemental information, the supplemental information will be shared with any user-attendees who are affiliated with any organization that the administrator has designated as eligible to have access to (e.g., view and otherwise interact with) the supplemental information. In the non-limiting example described here, this will include any second user-attendees affiliated with the second organization 250-2 who are included in the list of attendees, but could also include any other user-attendees (affiliated with the other organizations) that are included in the list of attendees that the administrator has approved to have access to the supplemental information. For sake of simplicity the following description will focus on sharing of the supplemental information with any second user-attendees who are affiliated with the second organization 250-2, but supplemental information can be shared with any user-attendees who are affiliated with any organization that the administrator has designated as eligible to have access to the supplemental information (e.g., view and otherwise interact with the supplemental information).

As such, in this example, when sharing of the supplemental information is enabled, the user systems 212-3 associated with second user-attendees (e.g., who are affiliated with the second organization 250-2) can display a calendar user interface 214-3 that allows any of the second user-attendees included in the list of attendees to view the supplemental information when viewing the calendar event. In this example, the supplemental information includes information about first-user attendees included on the list of attendees who are affiliated with the first organization 250-1 and/or information about the first organization 250-1. In one non-limiting embodiment, as will be described in greater detail below, when the second-user attendees included on the list of attendees views the calendar event and interacts with an identifier for a particular first-user attendee, the calendar user interface 214-3 can display an inline popup window (not illustrated in FIG. 2) that includes the supplemental information about that particular first-user attendee. For instance, in one implementation, the user can interact with (e.g., point-and-click) certain elements of a graphical user interface (GUI) displayed via the user system to select an identifier for the particular first-user attendee, the calendar user interface 214-3 can display the inline popup window that includes the supplemental information about that particular first-user attendee.

Various events or tasks performed by the various elements in FIG. 2 will be described in greater detail below with reference to FIGS. 3-7. For example, certain operations performed at or by the user systems 212, the organizations 250, the application platform 210, the calendar application 228, and the database systems 230 will be described below. In that regard, FIGS. 3-7 will be described with continued reference to FIG. 2.

Figure 3:
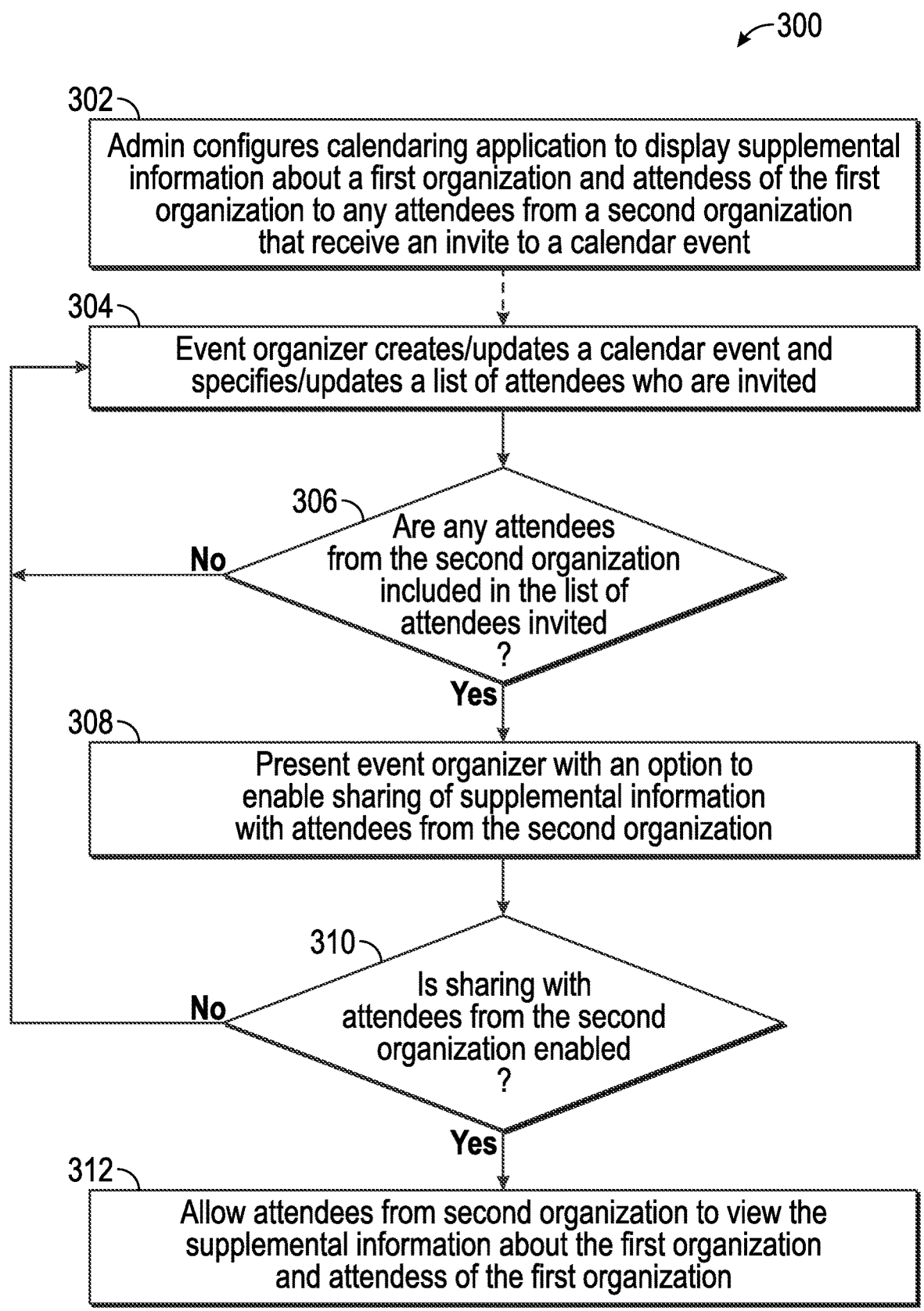
FIG. 3 is a flow chart that illustrates an exemplary method for providing attendees from a different organization with supplemental information related to a calendar event in accordance with the disclosed embodiments.

FIG. 3 is a flow chart that illustrates an exemplary method 300 for creating a calendar event in a calendar application 228 and providing at least some attendees from a different organization 250-2 with access to supplemental information related to the calendar event in accordance with the disclosed embodiments. As a preliminary matter, it should be understood that steps of the method 300 are not necessarily limiting, and that steps can be added, omitted, and/or performed simultaneously without departing from the scope of the appended claims. It should be appreciated that the method 300 may include any number of additional or alternative tasks, that the tasks shown in FIG. 3 need not be performed in the illustrated order, and that the method 300 may be incorporated into a more comprehensive procedure or process having additional functionality not described in detail herein. Moreover, one or more of the tasks shown in FIG. 3 could potentially be omitted from an embodiment of the method 300 as long as the intended overall functionality remains intact. It should also be understood that the illustrated method 300 can be stopped at any time. The method 300 is computer-implemented in that various tasks or steps that are performed in connection with the method 300 may be performed by software, hardware, firmware, or any combination thereof. For illustrative purposes, the following description of the method 300 may refer to elements mentioned above in connection with FIG. 3. In certain embodiments, some or all steps of this process, and/or substantially equivalent steps, are performed by execution of processor-readable instructions stored or included on a processor-readable medium. For instance, in the description of FIG. 3 that follows, the user systems 212, the organizations 250, the application platform 210, the calendar application 228, and the database systems 230 will be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 3, a particular example is described in which a user of a user system performs certain actions by interacting with other elements of the system via the user system. Various acts, tasks or steps FIG. 3 will be described below with reference to screenshots shown in FIGS. 4-7.

The method 300 begins at 302, where an administrator configures the calendar application 228 via an administrator control panel. The administrator can configure the calendar application 228 during the initial setup of the first organization 250-1, or can re-configure the calendar application 228 at any given time. In accordance with the disclosed embodiments, the administrator can configure the calendar application 228 to allow sharing of supplemental information by users who are affiliated with the first organization 250-1 when they are invitees to or attendees of a calendar event. As will be described in more detail below, in one embodiment, the administrator can specify certain fields from a group of available fields as being shared fields for the first organization 250-1. The group of available fields can include user fields from a user table that specifies information about a user, organization fields from an organization table that specifies information about the organization, and/or custom fields added by an administrator to either the user table, the organization table or another table. Once the administrator sets up this master list of shared fields, supplemental information associated with these shared fields is ready to be shared automatically when the event organizer creates a calendar event and enables sharing of the supplemental information with other users from different organizations. In some embodiments, the calendar application 228 can be pre-configured by defaults to automatically allow sharing of supplemental information associated with pre-determined "shared" fields, and if desired the administrator can re-configure any of those particular shared fields to prevent sharing of supplemental information associated with one or more of those particular shared fields. Furthermore, the event organizer can also re-configure any of the shared fields at any time to prevent sharing of supplemental information associated with any of those shared fields. There are many different reasons why such re-configuration may be performed, for example, if there are security or privacy concerns with sharing too much, or if the first organization 250-1 wanted to reduce the amount of information attendees have to consider when viewing a calendar event.

In some embodiments, the administrator can configure the calendar application 228 to allow sharing with other users from other organizations who utilize the same calendar application 228. When this sharing feature is restricted so that it applies and is available only on a single calendar system, if the event organizer creates a calendar event using another calendar system, and invites two attendees who use the calendar application 228 (that has been configured to allow sharing with other users from other organizations who are invited to a calendar event that utilizes the same calendar application 228), then those other users could still see each other's supplemental information when viewing the calendar event in their calendaring system, even though they would not see supplemental information from the event organizer, and the event organizer would not see any supplemental information.

To simplify the description that follows, it will be assumed that the administrator configures the calendar application 228 via an administrator control panel to allow sharing of the supplemental information with other user-attendees who are affiliated with a second organization 250-2 that utilizes the same calendar application 228 in the cloud computing system 200. For instance, in one example, the other user-attendees could be from a different company that uses the same calendar application 240. However, it is noted that the administrator may configured the calendar application 228 (at 302) to allow sharing of the supplemental information with other user-attendees who are affiliated with other organizations. In addition, it is also noted that in some embodiments, the administrator may also configure the calendar application 228 to allow sharing of the supplemental information with selected/specific user-attendees who are affiliated with the second organization 250-2.

At 304, an event organizer creates a calendar event via the calendar application 228. The calendar event can include, among other things, a list of attendees invited for the calendar event. To illustrate an example in the description that follows, it is assumed that the event organizer affiliated with the first organization 250-1, and that the list of attendees includes one or more of the second user-attendees affiliated with the second organization 250-2 for purposes of illustration. However, it should be appreciated that the event organizer can be affiliated with any organization and that the list of attendees can be affiliated with any number of different organizations.

At 306, the calendar application 228 can determine whether any of the attendees in the list are associated with an organization for which sharing has been enabled. In this example for purposes of explaining an example, it is assumed that the administrator has configured the calendar application 228 (at 302) to allow sharing of the supplemental information with only those other user-attendees who are affiliated with the second organization 250-2, and therefore, at 306, the calendar application 228 can determine whether any of the attendees in the list are associated with the second organization 250-2 for which sharing has been enabled. When the calendar application 228 determines (at 306) that none of the attendees in the list are associated with an organization for which sharing has been enabled, the method 300 loops to 304 where it waits for the list to be updated.

When the calendar application 228 determines (at 306) that any of the attendees in the list are associated with an organization for which sharing has been enabled, the method proceeds to 308, where the calendar application 228 presents the event organizer from the first organization 250-1 with an option to enable sharing of the supplemental information with any of the user-attendees, including the second user-attendees affiliated with the second organization 250-2, that are included in the list of attendees. At any time after sharing is enabled, the event organizer has the option to disable sharing of the supplemental information with any of the user-attendees. Likewise, the administrator can also disable sharing of the supplemental information at the organization level at any time.

At 310, the calendar application 228 can determine whether sharing of the supplemental information has been enabled for any user-attendees (including the second user-attendees affiliated with the second organization 250-2 that are included in the list of attendees).

When the calendar application 228 determines (at 310) that sharing of the supplemental information has not been enabled for any user-attendees, the method 300 loops back to 304. When the calendar application 228 determines (at 310) that the event organizer has enabled sharing of the supplemental information for at least some of the user-attendees included in the list of attendees, the method 300 proceeds to 312, where those user-attendees of those organizations (including any of the second user-attendees included in the list of attendees) are allowed to view and interact with the supplemental information when viewing the calendar event. For example, if a calendar event is created by a first user-attendee belongs to a first organization and sharing is enabled for second user-attendees who belong to a second organization, then any of those second user-attendees can view and interact with supplemental information that will be displayed via the calendar application. Other user-attendees from organizations that sharing has not been enabled for would not see the supplemental information. This allows for a more meaningful and productive meeting to be setup.

Figure 4:
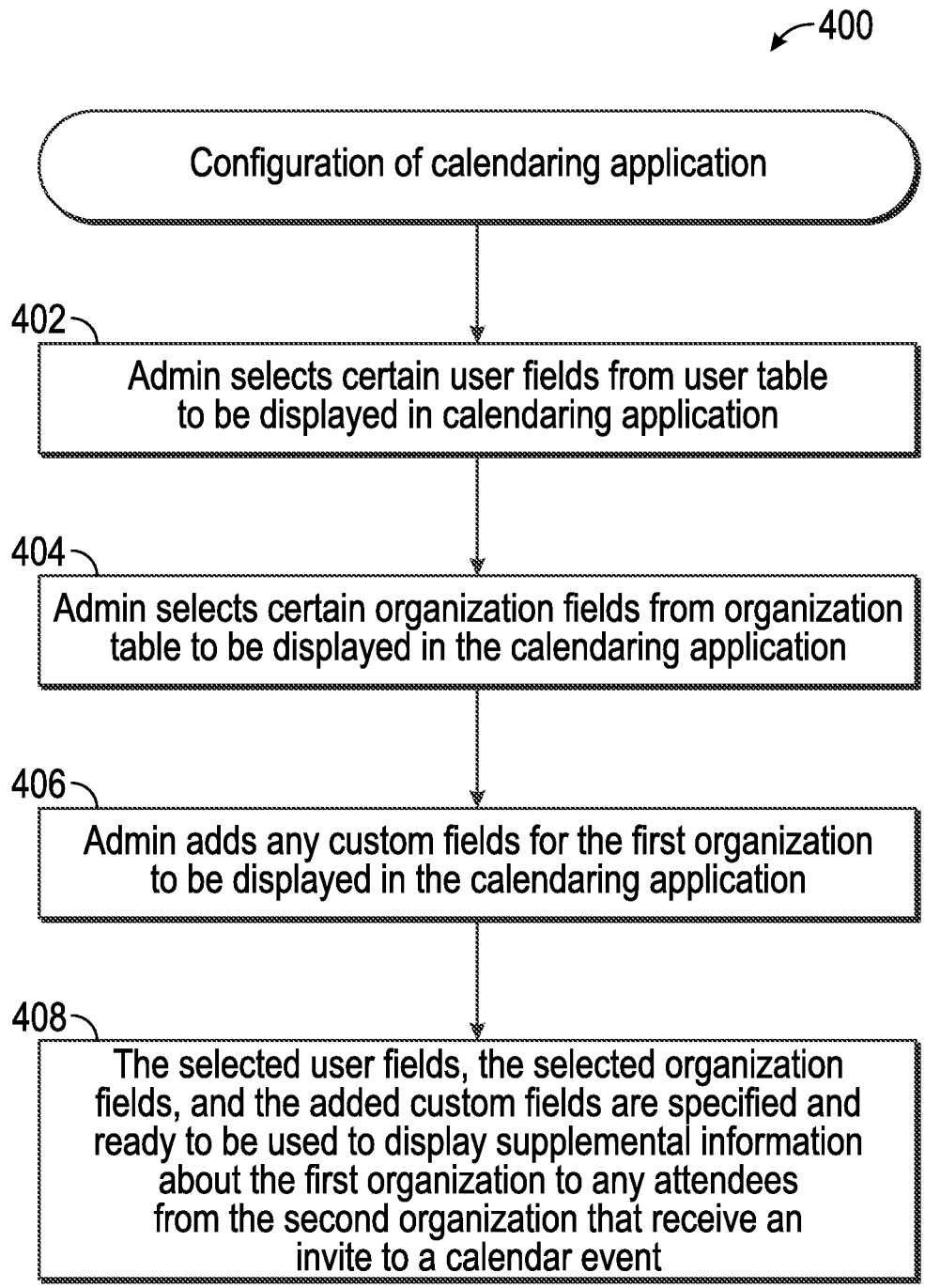
FIG. 4 is a flow chart that illustrates an exemplary method for configuring a calendaring application to provide supplemental information in accordance with the disclosed embodiments.

One exemplary embodiment of step 302 will be described with respect to FIGS. 4 and 5 to provide an example of how an administrator can configure the calendar application. FIG. 4 is a flow chart that illustrates an exemplary method for configuring a calendar application to provide supplemental information in accordance with the disclosed embodiments.

Figure 5:
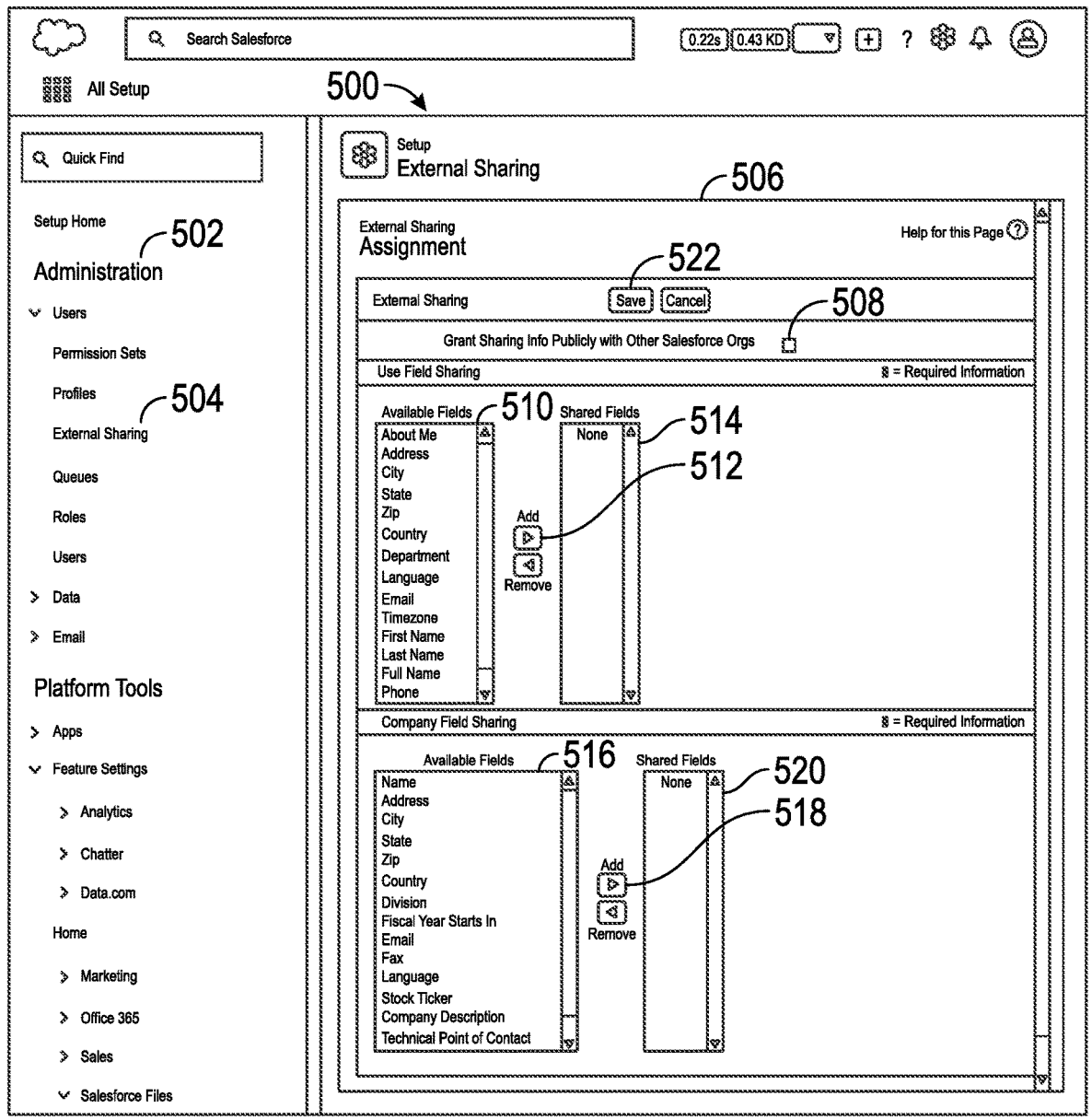
FIG. 5 illustrates a screenshot that shows an example of an external sharing page for configuring a calendaring application to provide supplemental information in accordance with the disclosed embodiments.

FIG. 5 illustrates a screenshot that shows an example of an external sharing page 500 for configuring a calendaring application to provide supplemental information in accordance with one exemplary implementation of the disclosed embodiments. FIG. 4 will be described with reference to FIG. 5. It should be appreciated that the method 400 may include any number of additional or alternative tasks, that the tasks shown in FIG. 4 need not be performed in the illustrated order, and that the method 400 may be incorporated into a more comprehensive procedure or process having additional functionality not described in detail herein. Moreover, one or more of the tasks shown in FIG. 4 could potentially be omitted from an embodiment of the method 400 as long as the intended overall functionality remains intact.

As illustrated in FIG. 5, the administrator control panel 502 includes an option 504 that can be selected to display and external sharing page 500. The administrator can select various fields from a group of available fields to specify those fields as being shared fields for the first organization 250-1. The shared fields are those that are allowed to be viewed by the second user-attendees who are affiliated with the second organization 250-2 so that the supplemental information for the first user-attendees can be shared with and allowed to be viewed by the second user-attendees who are affiliated with the second organization 250-2. Any other fields from the group of available fields that are not selected by the administrator remain as restricted fields for the first organization 250-1. The restricted fields each specify restricted information that is not allowed to be viewed by user-attendees who are affiliated with other organizations such as the second organization 250-2. This way the restricted information for the first user-attendees who are affiliated with the first organization 250-1 will not be shared with and not allowed to be viewed by the other user-attendees who are affiliated with other organizations such as the second organization 250-2.

In general, the supplemental information can include information about first-user attendees who are affiliated with the first organization 250-1 (who are included on the list of attendees), or information about the first organization 250-1. The supplemental information can include information for the first organization 250-1 that comes from the database systems 230, and in some embodiments, can also include information that comes from sources that are external to the database systems 230. The supplemental information for the first organization 250-1 is normally access-restricted (e.g., "view-restricted") to first user-attendees who are affiliated with the first organization 250-1 so that it is viewable by only the first-user attendees (or access-restricted to all user-attendees such that it is not viewable at all by anyone within the context of the calendar application 228 or any calendar events). However, when the calendar application 228 is configured to allow sharing of the supplemental information with user-attendees who are affiliated with another organization (e.g., with the second user-attendees who are affiliated with the second organization 250-2), the supplemental information can be displayed as part of a calendar event.

As illustrated in FIG. 4, at 402, the administrator can select or specify any number of user fields 510 that specify supplemental information about the user to add the shared user fields 514 by highlighting the user field and then selecting the add button 512 to add that user field to the shared user fields 514. The user fields can be included in a user table. In this embodiment, some non-limiting examples of user fields can include, but are not limited to: an about me description field that specifies a user profile that includes data about a user such as a biographical summary, a photo, etc., contact details fields including user address field, user city field, user state field, user zip code field, user country field, a user department field that indicates the department within an organization that the user works in, a primary of preferred language field, normal timezone field, a primary email address field, a first name field, a last name field, a full name field, and a business phone number field. Other user fields not illustrated in FIG. 4 can include, for example, job title field, current time zone field, normal working hours field, current working hours field, out of office notification field, a mobile phone number field, a secondary email field, social media handle field, a secondary languages field, a status field (e.g., text describing what the user is currently doing), etc.

At 404, the administrator can select or specify any number of organization fields 516 that specify supplemental information about the organization to add the shared organization fields 520 by highlighting the organization field and then hitting the add button 518 to add that organization field to the shared organization fields 520. The organization fields can be included in an organization table. In this embodiment, some non-limiting examples of organization fields can include, but are not limited to: a company name field, a company mailing address field, a company city field, a company a state field, a company zip code field, a company country field (e.g., country or region where a company is headquartered), a division name field, a fiscal year start date field, a company email field, a company fax number field, a predominant language field that indicates the main language used by the company, a company stock symbol or stock ticker field, an organization description field (e.g., company description field), and a technical point of contact field for organization (e.g., email address for technical contact). Other organization fields not illustrated in FIG. 4 can include, for example, a fiscal year end date field, the organization's preferred web meeting provider field, etc.

As illustrated in FIG. 4, at 406, the administrator can also optionally select or specify any number of custom fields (not illustrated in FIG. 5). This option is available in platforms such as Salesforce.com that support adding additional "custom fields" or information that can be shared. The custom fields can be added by the administrator to specify other custom information that is specific to that organization, but that is not a standard field. The custom fields can specify supplemental information about the user or organization that can be added as shared custom fields. The custom fields can be included in a customization table, or can be added by the administrator to either the user table, the organization table or another table. For example, the Salesforce.com platform is built upon objects/tables such as the organization object or the user object. With each of these objects additional information in the form of fields can be added. If the administrator adds a certification field to the user object, this information could also be shared with other users who use the same calendaring system. While most calendaring systems either don't allow adding metadata or only allow adding it to events, in the context of systems such as Salesforce.com, metadata can be added once to a user object and displayed any time this user is added as an attendee to a meeting where they are on the same calendaring system as the organizer of the event.

At 408, the selected user fields, the selected organization fields, and the added custom fields are specified and ready to be used to display supplemental information about the first organization or user-attendees of the first organization to any other user-attendees from other organizations that receive an invite to a calendar event. As shown in FIG. 5, the administrator can then check box 508 to grant sharing with other organizations, and select save button 522 to save all of the fields designated as shared fields thereby configuring the calendar application for external sharing. This supplemental information would be available when viewing a meeting or when scheduling a meeting. By allowing the administrator to restrict which information is sharable on a field-by-field basis a high degree of granularity and flexibility is provided. For example, if an organization does not want to identify which location they are located in or any other information, the administrator for that organization can restrict the information and it will not be shared to any of the other meeting attendees. In one non-limiting embodiment, the supplemental information is shared only with the user-attendees who use the same calendar system and calendar application 228 as the event organizer who created the calendar event. By restricting sharing of supplemental information with only with the user-attendees who use the same calendar system and calendar application 228 as the event organizer, this allows for the calendar system and application 228 to be promoted so that user-attendees will have an incentive to adopt that calendar system and calendar application 228 since it will allow them to use a calendar system that provides access to supplemental information, and thus provides a better user experience due to the availability of supplemental information that would not otherwise be readily available. As a result, the more people who use the same calendaring system, will lead to more productive meetings. Further, in platforms like Salesforce.com there are direct links between the Salesforce calendar system and other calendar applications like Microsoft Exchange/Office365 and Google Calendar. As such, if an event is created in the Salesforce.com platform it will show up automatically in Microsoft Exchange/Office365 or Google Calendar, and vice-versa. Thus, for example, if a meeting includes attendees who are Microsoft Exchange users who are also Salesforce users and Google Calendar users who are Salesforce customers, then supplemental information can be shared between them because they are both using the Salesforce calendar system.

Figures 6, 7:
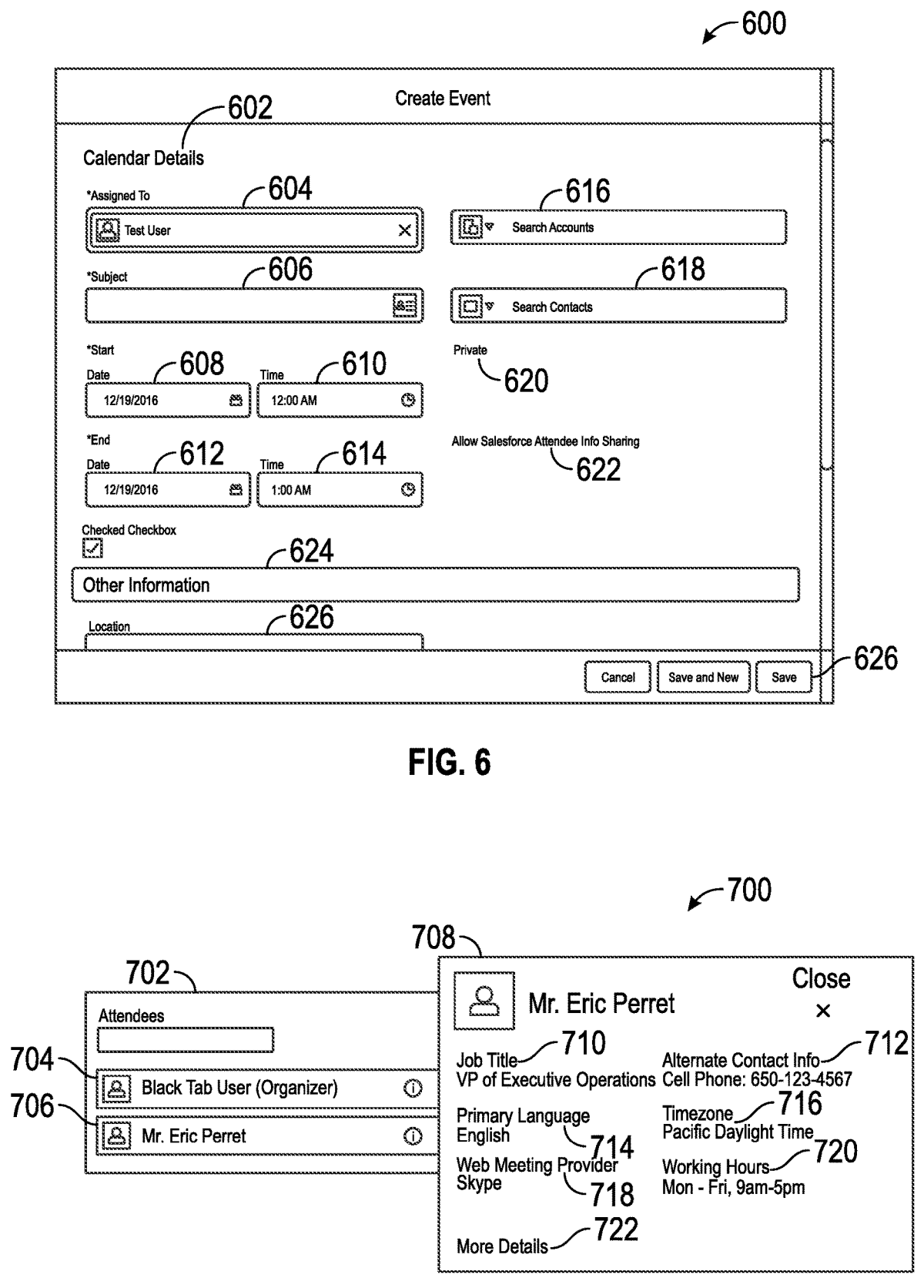

FIG. 6 illustrates a screenshot that shows an example of a calendar event creation page 600 in accordance with the disclosed embodiments. The calendar event creation page 600 can be displayed at a user system of an event organizer when he/she creates a calendar event. In this non-limiting embodiment, the calendar event creation page 600 includes a section 602 that allows the event organizer to input calendar details, and another section 624 that allows the event organizer to input other information, such as location 626 of the event. The calendar details can include fields 604-618 that allow the event organizer to input information such as the event organizer name 604 (or equivalent identifier for the event organizer), the subject 606 of the calendar event, a start date 608, a start time 610, an end date 612, and an end time 614 for the calendar event, an association field 616, and an attendee list 618 for invitees that the event organizer is inviting to this calendar event. The association field 616 can be used to associate the calendar event with a particular entity (e.g., a sales or service customer). For example, if an event organizer creates a meeting invite between five different people, the association field can be used to indicate who the meeting is about (e.g., to indicate if the meeting is about a contact, like the CTO of a company, a potential lead for a new sale, or the account being discuss in the meeting). The calendar details section 602 can also include two check boxes 620, 622 one of which can be selected by the event organizer in any given instance of the calendar event creation page 600. Check box 620 can be selected by the event organizer if the event organizer wants the calendar application 228 to prevent sharing of the supplemental information with any of the user-attendees included in the list of attendees who are from different organizations. If the event organizer deems that the supplemental information should not be shared then the calendaring system will prevent the sharing of attendee information. Thus, by selecting check box 620, the event organizer can prevent sharing of supplemental information at the event level.

By contrast, check box 622 can be selected by the event organizer if the event organizer wants the calendar application 228 to allow sharing of the supplemental information with any of the user-attendees included in the list of attendees who are from different organizations. As such, the event organizer can configure the calendar application 228 to enable sharing of the supplemental information with any of the user-attendees that are included in the list of attendees.

In this regard, it is noted that the event organizer can configure multiple instances of the calendar event creation page 600 if the event organizer wants the calendar application 228 to allow sharing of the supplemental information with some user-attendees included in the list of attendees who are from certain different organizations in one calendar event creation page 600, but wants to prevent sharing of the supplemental information with other user-attendees included in the list of attendees who are from other different organizations via another calendar event creation page 600.

FIG. 7 illustrates a screenshot 700 of an attendee tab 702 for a calendar event that shows an example of an inline popup window 708 that can be displayed to show information about an attendee including supplemental information 710-720 about that attendee in accordance with the disclosed embodiments In this example, the attendee tab 702 shows two attendees for sake of simplicity, but can include any number of attendees. One of the attendees in the event organizer 704 (BlackTab User) who is affiliated with a first organization, and the other attendee is user-attendee 706 (Mr. Eric Perret) who is affiliated with a second organization. The attendee tab 702 for this calendar event is displayed via a user interface at a user system of the event organizer 704. An administrator (not shown) has configured the calendar application to share supplemental information for user-attendees who are affiliated with the second organization when the calendar event is displayed to user-attendees from the first organization.

As such, when the event organizer 704 (BlackTab User) views the calendar event and selects user-attendee 706 (Mr. Eric Perret) by, for example, clicking on or hovering over an icon, the inline popup window 708 can be displayed to show supplemental information 710-720 about user-attendee 706 (Mr. Eric Perret). In addition to his full name, supplemental information 710-720 about user-attendee 706 (Mr. Eric Perret) is also displayed in the inline popup window 708 including his job title 710, alternate contact information 712, his primary language 714, his timezone 716, his preferred web meeting provider 718, his normal working days and hours 720, and a link 722 that allows the event organizer 704 (BlackTab User) to view other supplemental information about user-attendee 706 (Mr. Eric Perret).

The following description is of one example of a system in which the features described above may be implemented. The components of the system described below are merely one example and should not be construed as limiting. The features described above with respect to FIGS. 1-7 may be implemented in any other type of computing environment, such as one with multiple servers, one with a single server, a multi-tenant server environment, a single-tenant server environment, or some combination of the above.

Figure 8:
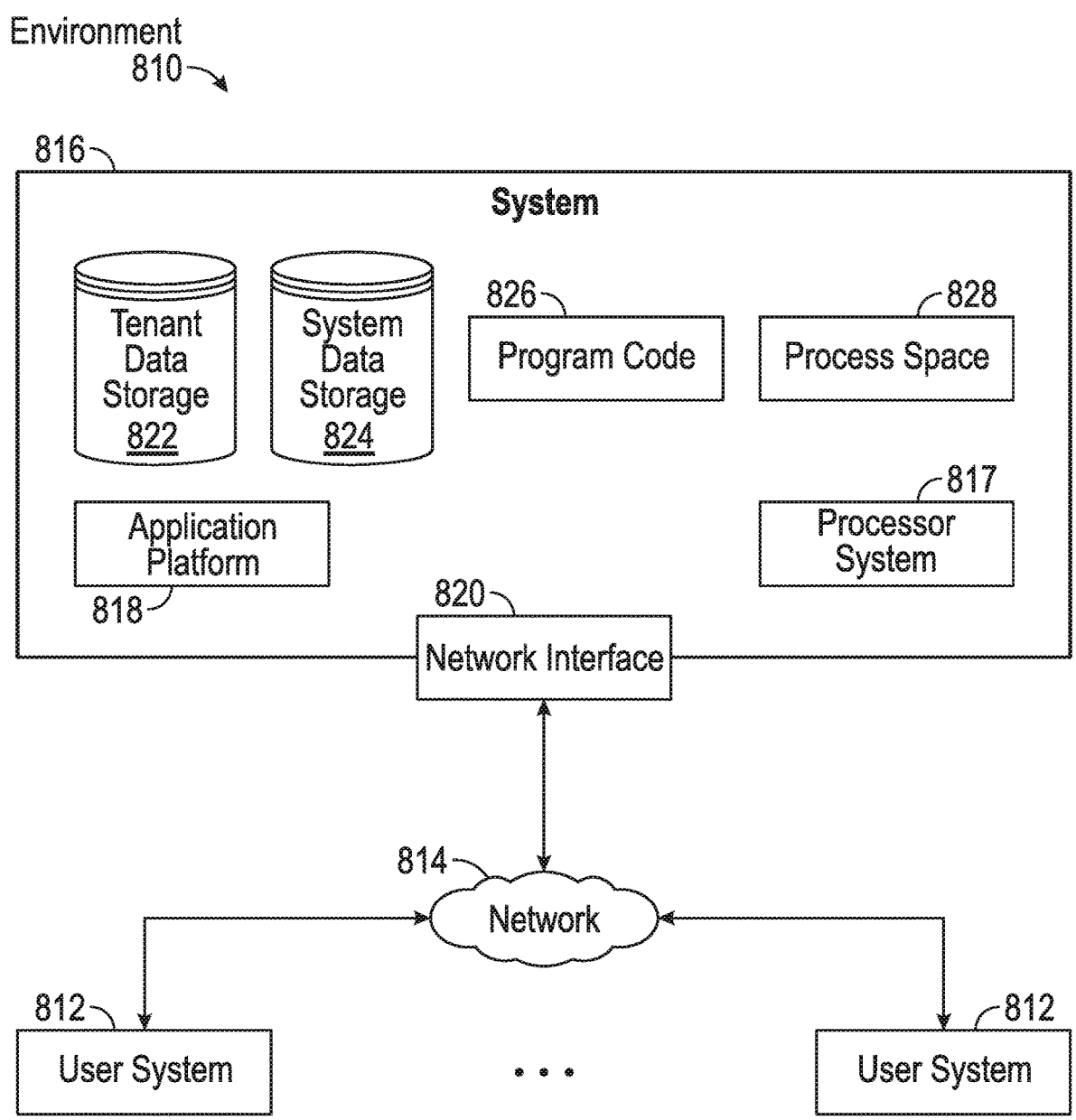
FIG. 8 shows a block diagram of an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
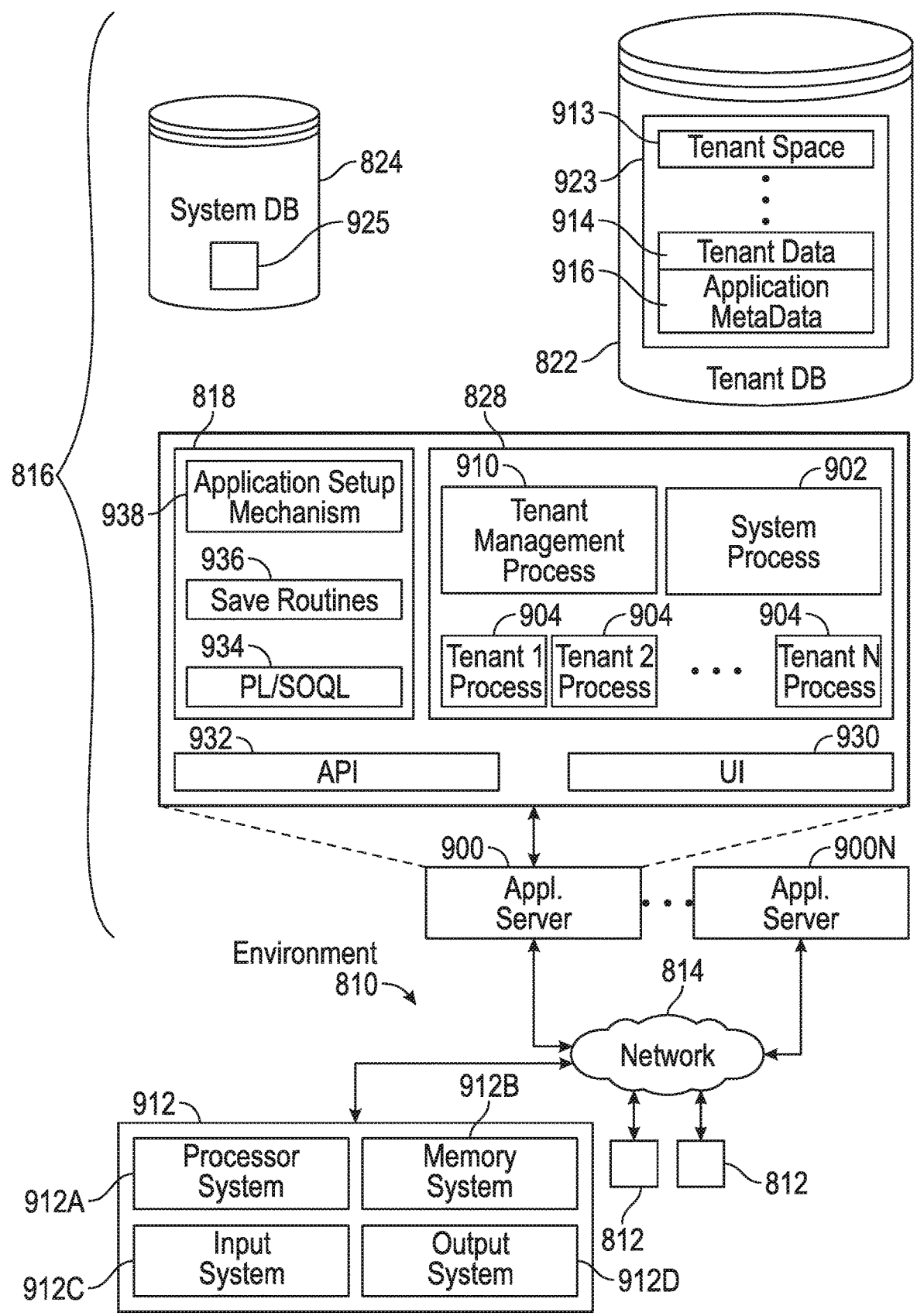
FIG. 9 shows a block diagram of example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers $900_1$-$1400_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server $900_1$ can be coupled via the network 814 (for example, the Internet), another application server $900_N$ can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
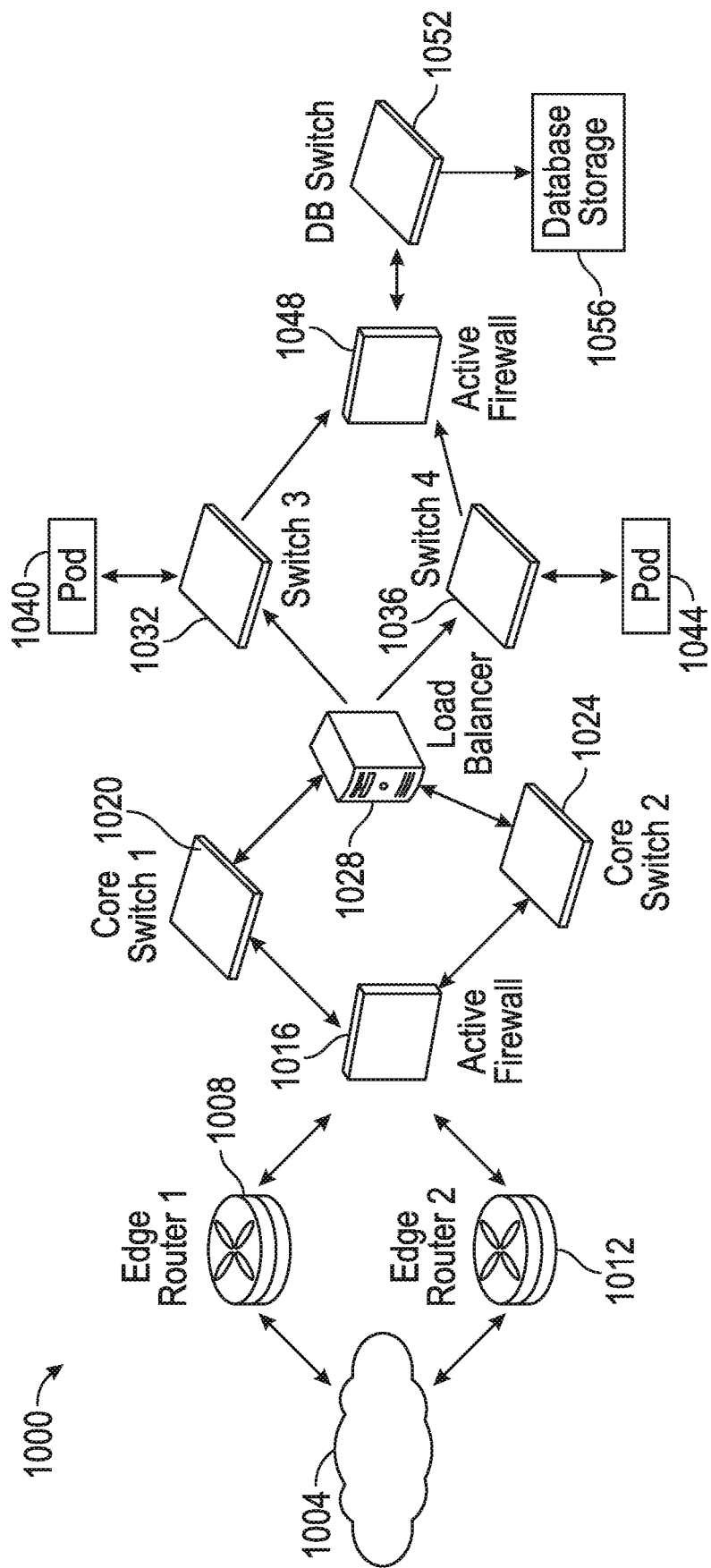
FIG. 10A shows a system diagram illustrating example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
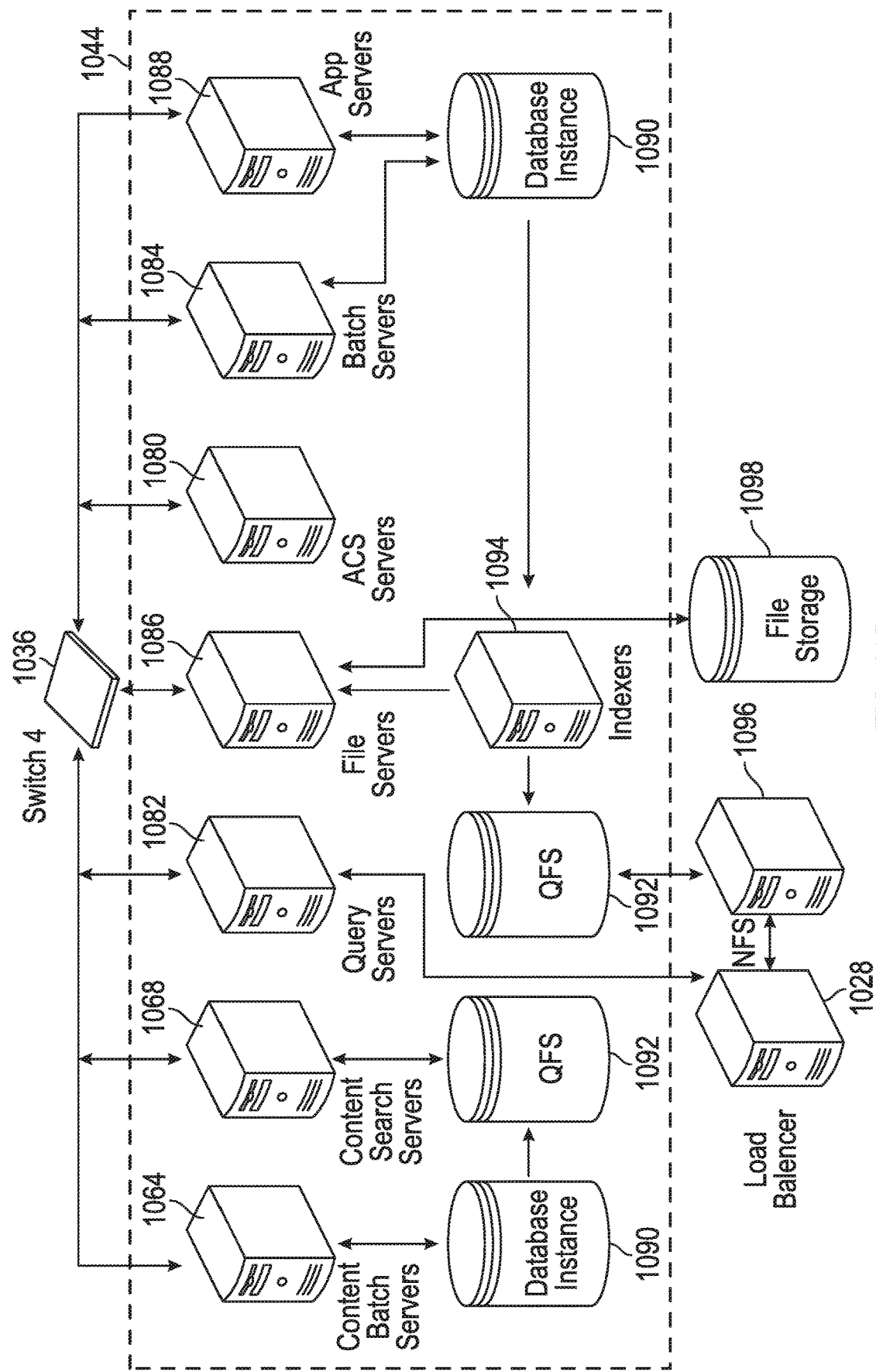
FIG. 10B shows a system diagram further illustrating example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
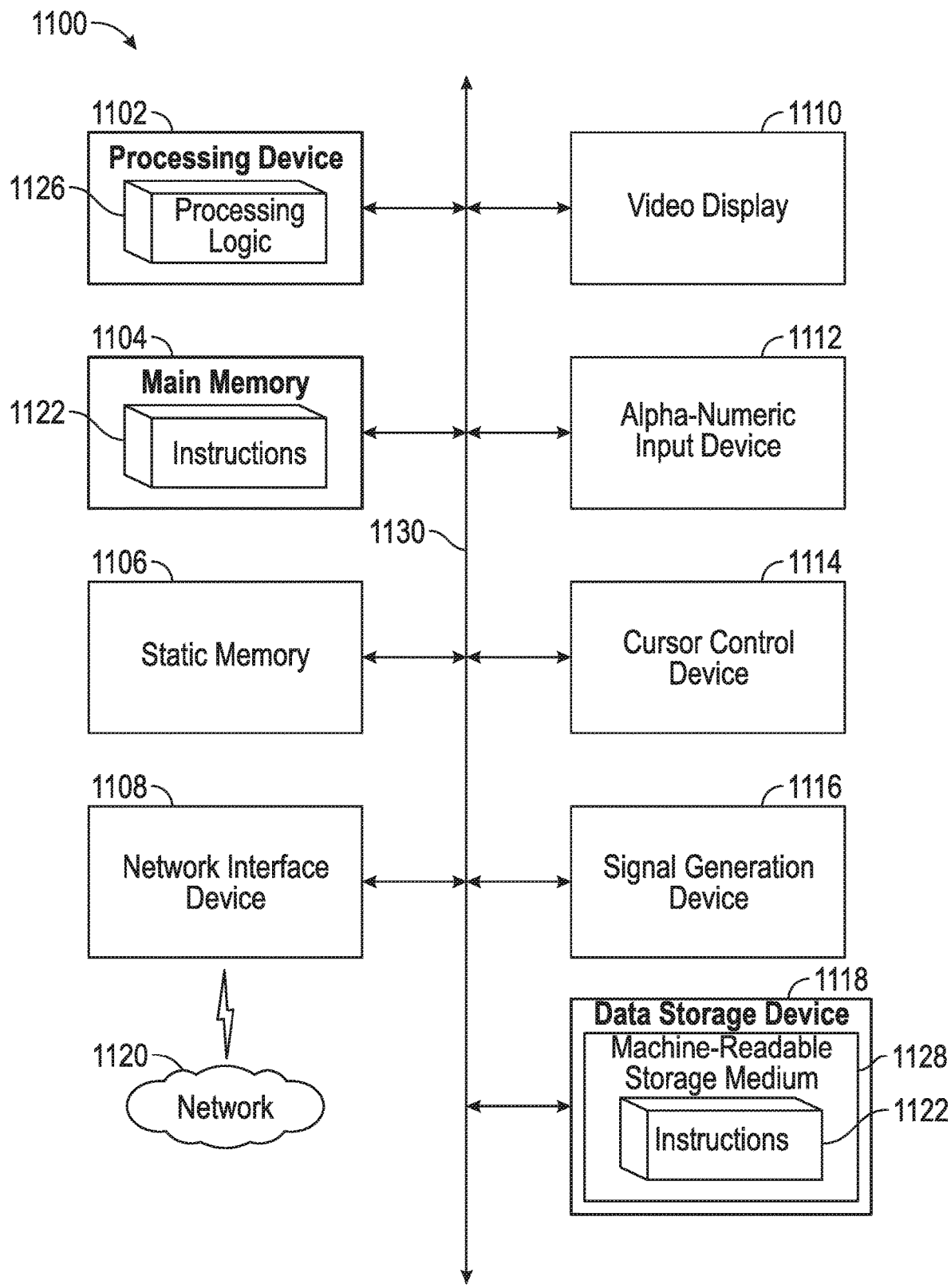
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for creating a calendar event in a calendar application to provide at least some attendees with access to supplemental information related to the calendar event, the method comprising:
    creating, by an event organizer affiliated with a first organization that utilizes the calendar application in a cloud computing system, the calendar event, wherein the calendar event includes a list of attendees invited for the calendar event, wherein the list of attendees includes at least one second user-attendee affiliated with a second organization that utilizes the calendar application, wherein the calendar application is configurable to allow sharing of the supplemental information between users who are affiliated with the first organization and other users who are affiliated with the second organization;
    presenting, when the calendar event is created, the event organizer from the first organization with an option to enable sharing of the supplemental information with any of the second user-attendees affiliated with the second organization that are included in the list of attendees; and
    configuring the calendar application, via an administrator control panel, to allow sharing of the supplemental information between users who are affiliated with the first organization that utilizes the calendar application in a cloud computing system and other users who are affiliated with the second organization that utilizes the calendar application, the configuring comprising:
        specifying certain fields from a group of available fields as being shared fields for the first organization, wherein the shared fields are those that are allowed to be viewed by the second user-attendees who are affiliated with the second organization so that the supplemental information for the first user-attendees is shared with and allowed to be viewed by the second user-attendees who are affiliated with the second organization; and
        leaving other fields from the group of available fields as restricted fields for the first organization, wherein the restricted fields each specify restricted information that is not allowed to be viewed by the second user-attendees who are affiliated with the second organization so that the restricted information for the first user-attendees who are affiliated with the first organization is not shared with and not allowed to be viewed by the second user-attendees who are affiliated with the second organization;
    when sharing of the supplemental information is enabled:
        allowing any of the second user-attendees included in the list of attendees to view the supplemental information specified by the shared fields when viewing the calendar event while preventing the second user-attendees from viewing the restricted information specified by the restricted fields, wherein the supplemental information comprises: information about first-user attendees who are affiliated with the first organization and included on the list of attendees, or information about the first organization.

2. The method according to claim 1, wherein the group of available fields comprise:
    user fields from a user table that specifies information about the user.

3. The method according to claim 2, wherein the group of available fields comprise:
    organization fields from an organization table that specifies information about the organization.

4. The method according to claim 3, wherein the group of available fields comprise:
    custom fields added by an administrator to either the user table, the organization table or another table.

5. The method according to claim 3, wherein the group of available fields comprise: information that comes from a multi-tenant database system and information that comes from sources that are external to the multi-tenant database system.

6. The method according to claim 1, wherein allowing further comprises:
    displaying an inline popup window that includes the supplemental information about a particular first-user attendee, when one of the second-user attendees included on the list of attendees is viewing the calendar event and interacts with user interface element for that particular first-user attendee.

7. The method according to claim 1, wherein the supplemental information for the first organization is normally access-restricted to first user-attendees who are affiliated with the first organization so that it is viewable by only the first-user attendees unless the calendar application is configured to allow sharing of that supplemental information with the second user-attendees who are affiliated with the second organization.

8. A cloud computing system for creating a calendar event to provide at least some attendees with access to supplemental information related to the calendar event, the system comprising:
- a cloud computing platform, comprising: a calendar application; and a database;
- a first user system affiliated with the first organization and being configured to display a user interface used to create the calendar event, the calendar event including a list of attendees invited for the calendar event, wherein the list of attendees includes at least one second user-attendee affiliated with the second organization, wherein the first user system is further configured to present, when the calendar event is created, an option to enable sharing of the supplemental information with any second user-attendees affiliated with the second organization that are included in the list of attendees;
- one or more second user systems affiliated with the second organization and being configured to display another user interface that allows any of the second user-attendees included in the list of attendees to view, when sharing of the supplemental information is enabled, the supplemental information specified by the shared fields when viewing the calendar event while preventing the second user-attendees from viewing the restricted information specified by the restricted fields, wherein the supplemental information comprises: information about first-user attendees who are affiliated with the first organization and included on the list of attendees, or information about the first organization; and
- a third user system configured to display an administrator control panel that is configured to receive inputs to configure the calendar application to allow sharing of the supplemental information between users who are affiliated with the first organization that utilizes the calendar application and other users who are affiliated with the second organization that utilizes the same calendar application,
- wherein the inputs received by the administrator control panel to configure the calendar application specify certain fields from a group of available fields as being shared fields for the first organization, wherein the shared fields are those that are allowed to be viewed by the second user-attendees who are affiliated with the second organization so that the supplemental information for the first user-attendees is shared with and allowed to be viewed by the second user-attendees who are affiliated with the second organization,
- wherein other fields from the group of available fields that are not selected remain as restricted fields for the first organization, wherein the restricted fields each specify restricted information that is not allowed to be viewed by the second user-attendees who are affiliated with the second organization so that the restricted information for the first user-attendees who are affiliated with the first organization is not shared with and not allowed to be viewed by the second user-attendees who are affiliated with the second organization.

9. The system according to claim 8, wherein the group of available fields comprise:
- user fields from a user table that specifies information about the user, organization fields from an organization table that specifies information about the organization, and custom fields added by an administrator to either the user table, the organization table or another table.

10. The system according to claim 9, wherein the group of available fields comprise: information that comes from a multi-tenant database system and information that comes from sources that are external to the multi-tenant database system.

11. The system according to claim 8, wherein the user interface of the one or more second user systems affiliated with the second organization is configured to display an inline popup window that includes the supplemental information about a particular first-user attendee when one of the second-user attendees included on the list of attendees views the calendar event and interacts with an identifier for that particular first-user attendee.

12. The system according to claim 8, wherein the supplemental information for the first organization is normally access-restricted to first user-attendees who are affiliated with the first organization so that it is viewable by only the first-user attendees unless the calendar application is configured to allow sharing of that supplemental information with the second user-attendees who are affiliated with the second organization.

13. A computing system comprising a processor and a memory, wherein the memory comprises computer-executable instructions that are capable of causing the computing system to:
- create a calendar event by an event organizer affiliated with a first organization that utilizes a calendar application in a cloud computing system, wherein the calendar event includes a list of attendees invited for the calendar event that includes at least one second user-attendee affiliated with a second organization that utilizes the calendar application, wherein the calendar application is configurable to allow sharing of the supplemental information between users who are affiliated with the first organization and other users who are affiliated with the second organization;
- configure the calendar application, based on inputs specifying certain fields from a group of available fields as being shared fields for the first organization, to allow sharing of supplemental information, related to the calendar event, between users who are affiliated with the first organization and the other users who are affiliated with the second organization that utilizes the same calendar application in the cloud computing system, the configuring comprising:
  - specifying certain fields from a group of available fields as being shared fields for the first organization, wherein the shared fields are those that are allowed to be viewed by the second user-attendees who are affiliated with the second organization so that the supplemental information for the first user-attendees is shared with and allowed to be viewed by the second user-attendees who are affiliated with the second organization; and
  - leaving other fields from the group of available fields as restricted fields for the first organization, wherein the restricted fields each specify restricted information that is not allowed to be viewed by the second user-attendees who are affiliated with the second organization so that the restricted information for the first user-attendees who are affiliated with the first organization is not shared with and not allowed to be viewed by the second user-attendees who are affiliated with the second organization; and
- allow, when sharing of the supplemental information is enabled, any of the second user-attendees included in the list of attendees to view the supplemental information specified by the shared fields when viewing the calendar event while preventing the second user-attendees from viewing the restricted information specified by the restricted fields, wherein the supplemental information comprises: information about first-user attendees who are affiliated with the first organization and included on the list of attendees, or information about the first organization.

14. The computing system of claim 13, wherein the group of available fields comprise: user fields from a user table that specifies information about the user, organization fields from an organization table that specifies information about the organization, and custom fields added by an administrator to either the user table, the organization table or another table.

15. The computing system of claim 13, wherein the group of available fields comprise: information that comes from a multi-tenant database system and information that comes from sources that are external to the multi-tenant database system, and wherein the supplemental information for the first organization is normally access-restricted to first user-attendees who are affiliated with the first organization so that it is viewable by only the first-user attendees unless the calendar application is configured to allow sharing of that supplemental information with the second user-attendees who are affiliated with the second organization.

* * * * *